US011878942B2

(12) United States Patent
Lucero et al.

(10) Patent No.: US 11,878,942 B2
(45) Date of Patent: Jan. 23, 2024

(54) CEMENTITIOUS COMPOSITIONS WITH ACCELERATED CURING AT LOW TEMPERATURES

(71) Applicant: SIKA TECHNOLOGY AG, Baar (CH)

(72) Inventors: Andrea Lucero, Rutherford, NJ (US); Mohamed Cader, Cranford, NJ (US); Flaviane Alves Dos Santos, Hoboken, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 307 days.

(21) Appl. No.: 17/288,103

(22) PCT Filed: Dec. 23, 2019

(86) PCT No.: PCT/EP2019/086919
§ 371 (c)(1),
(2) Date: Apr. 23, 2021

(87) PCT Pub. No.: WO2020/144064
PCT Pub. Date: Jul. 16, 2020

(65) Prior Publication Data
US 2021/0380482 A1 Dec. 9, 2021

(51) Int. Cl.
| | | |
|---|---|---|
| C04B 28/06 | (2006.01) | |
| C04B 14/06 | (2006.01) | |
| C04B 14/28 | (2006.01) | |
| C04B 22/08 | (2006.01) | |
| C04B 24/02 | (2006.01) | |
| C04B 40/00 | (2006.01) | |
| C04B 40/06 | (2006.01) | |
| C04B 103/10 | (2006.01) | |
| C04B 103/32 | (2006.01) | |
| C04B 103/60 | (2006.01) | |
| C04B 111/00 | (2006.01) | |
| C04B 111/72 | (2006.01) | |

(52) U.S. Cl.
CPC ............ *C04B 28/065* (2013.01); *C04B 14/06* (2013.01); *C04B 14/28* (2013.01); *C04B 22/085* (2013.01); *C04B 24/02* (2013.01); *C04B 40/0039* (2013.01); *C04B 40/065* (2013.01); *C04B 2103/10* (2013.01); *C04B 2103/32* (2013.01); *C04B 2103/601* (2013.01); *C04B 2111/00681* (2013.01); *C04B 2111/72* (2013.01)

(58) Field of Classification Search
CPC ....... C04B 28/065; C04B 14/06; C04B 14/28; C04B 22/085; C04B 24/02; C04B 40/0039; C04B 40/065; C04B 2103/10; C04B 2103/32; C04B 2103/601; C04B 2111/00681; C04B 2111/72; C04B 2111/00672; C04B 2111/0075; C04B 2111/60; C04B 2111/70; C04B 2111/76; C04B 28/14; C04B 28/06; Y02W 30/91
See application file for complete search history.

(56) References Cited

U.S. PATENT DOCUMENTS

| | | |
|---|---|---|
| 5,176,753 A | 1/1993 | Brook |
| 5,296,028 A | 3/1994 | Korhonen et al. |
| 2006/0070553 A1 | 4/2006 | Guinot et al. |

FOREIGN PATENT DOCUMENTS

| | | | |
|---|---|---|---|
| CN | 105884239 A | 8/2016 | |
| GB | 2 058 037 A | 4/1981 | |
| GB | 2 195 328 A | 4/1988 | |
| WO | 2004/060828 A2 | 7/2004 | |
| WO | 2014/070231 A1 | 5/2014 | |
| WO | WO-2018083010 A1 * | 5/2018 | ............ B28B 1/001 |
| WO | 2018/189295 A1 | 10/2018 | |

OTHER PUBLICATIONS

Apr. 7, 2020 International Search Report issued in International Patent Application No. PCT/EP2019/086919.
Apr. 7, 2020 Written Opinion issued in International Patent Application No. PCT/EP2019/086919.
Gerhard Elsner et al., "Polyols," Corrosion Handbook, Jan. 15, 2008, pp. 1-29, XP055679618, Frankfurt, Germany.

\* cited by examiner

*Primary Examiner* — Anthony J Green
(74) *Attorney, Agent, or Firm* — Oliff PLC

(57) ABSTRACT

A cementitious composition with accelerated curing at low temperatures particularly at temperatures <5° C., especially at temperatures <0° C. The cementitious composition consists of 2 components with a first component A including at least one ordinary Portland cement, at least one cement selected from calcium aluminate cement and/or calcium sulfoaluminate cement, a powder P, selected from the group consisting of carbonates or hydrogen carbonates of alkali and/or alkaline earth metals, optionally aggregates, optionally other additives and a second component B comprising at least one accelerator, an anti-freeze agent, water, and optionally other additives. The composition shows increased development of compressive strength, maintain good workability, and have particularly low shrinkage, also when cured at temperatures <5° C., especially <0° C., and as low as −10° C.

15 Claims, No Drawings

CEMENTITIOUS COMPOSITIONS WITH ACCELERATED CURING AT LOW TEMPERATURES

TECHNICAL FIELD

The invention relates to cementitious compositions with accelerated curing at low temperatures. The invention also relates to uses of cementitious compositions with accelerated curing at low temperatures and to methods for mixing and placing of cementitious compositions at low temperatures.

BACKGROUND OF THE INVENTION

Cementitious compositions which cure by the hydraulic reaction of cementitious binders with water, are significantly retarded when mixed and/or placed at low temperatures. This can lead to prolonged setting time and slow curing, especially a slow built-up of compressive strength, which in turn may lead to longer waiting periods before further work or release for use can be done. In particularly unfavorable cases cementitious compositions do not set and cure at all. Most cementitious binder compositions require temperatures above 5° C. during mixing and placing for proper development of properties. As temperatures in different climate zones can drop well below 5° C. for significant periods of time during the year measures such as tempering of raw materials, heating of job sites, or accelerating the hydraulic reaction of cementitious binders, need to be taken. Especially the tempering of raw materials or the heating of job sites can be difficult, expensive or even impossible at a given job site.

The use of specialized cements such as calcium aluminate cement (CAC) or calcium sulfoaluminate cement (CSA) either alone or in combination with ordinary Portland cement (OPC) leads to mortars and concrete formulations that show accelerated curing.

A further advantage of the use of CAC and/or CSA in blends with OPC is that during the production CAC and CSA less heat is needed and less $CO_2$ is generated as compared to the production of OPC. The use of blended cements thus constitutes an advantage in terms of energy saving and environmental protection.

However, the use of CAC and CSA cements is problematic in terms of long-term ageing especially in outside applications. Furthermore, OPC generally leads to less shrinkage as compared to CAC. Additionally, the global availability of OPC is better and thus cost is lower. Therefore, the use of OPC-rich blends with CAC and/or CSA is particularly advantageous.

EP 1578703 (Kerneos) discloses OPC-rich mortar compositions with slurries containing calcium aluminates added as an accelerator. However, acceleration at temperatures <5° C. and as low as −10° C. is not disclosed. Furthermore, the use of slurries of calcium aluminate as accelerator poses problems in terms of shelf life, dosage, and handling of said slurries.

WO 2014/070231 (Brien) discloses a polymer latex modified cementitious composition which is based on mixtures of CSA or CAC and OPC cements, which uses lithium carbonate as an accelerator and which is suitable to be applied at low temperatures and even below the freezing point of water. However, the system described therein is not suitable for OPC-rich blends of cement. Furthermore, the lithium salt used as an accelerator is expensive and not always well available.

There is thus a need for improved cementitious compositions that are based on OPC-rich blends of cements with CAC and/or CSA and that show accelerated curing at low temperatures, particularly at temperatures <5° C., especially at temperatures <0° C.

DESCRIPTION OF THE INVENTION

It is thus an object of the present invention to provide cementitious compositions which are based on OPC-rich blends of OPC with CAC and/or CSA and which show an accelerated curing at low temperatures, particularly at temperatures <5° C., especially at temperatures <0° C. It is another object of the present invention to provide methods for the application and accelerated curing of cementitious compositions at low temperatures, particularly at temperatures <5° C.

It has surprisingly been found that the objective of the invention can be achieved by a cementitious composition as claimed in claim 1.

A cementitious composition of the present invention accordingly essentially consists of a first component A comprising
  a) 15-69 w % of at least one ordinary Portland cement (OPC),
  b) 1-25 w % of at least one cement selected from calcium aluminate cement (CAC) and/or calcium sulfoaluminate cement (CSA),
  c) 0.1-15 w % of a powder P, selected from the group consisting of carbonates or hydrogen carbonates of alkali and/or alkaline earth metals,
  d) optionally 30-70 w % of aggregates,
  e) optionally 1-15 w % of other additives selected from the groups of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
  each based on the total weight of the component A,
  and a second component B comprising
  f) 30-90 w % of at least one accelerator selected from the group consisting of alkanolamines, halides, formats, acetates, oxalates, nitrites, nitrates, thiocyanates, sulphates, thiosulphates, glycerol, α-hydroxycarboxylic acids, and calcium aluminates,
  g) 0.1-5 w % of an anti-freeze agent,
  h) 10-70 w % of water, and
  i) optionally other additives selected form the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
  each based on the total weight of the component B.

According to particularly preferred embodiments, the weight ratio of the at least one OPC to the at least one CAC and/or CSA is >1, preferably >2, more preferably >5.

According to further particularly preferred embodiments, the powder P has a particle size D50 of <10 μm, preferably <5 μm.

It has been found that a composition of the present invention shows a highly increased development of compressive strength within the first 24 h of curing, if cured at temperatures <5° C., especially <0° C., and as low as −10° C. when compared to a reference based on a cement mixture of OPC and CAC with a weight ratio <1 and without the powder P.

It has further been found that the development of compressive strength of a cementitious composition of the present invention is highly increased within the first 24 h of curing, preferably within the first 12 h of curing, also if one or both components A and B of said cementitious composition are stored, handled, and mixed at temperatures <5° C., preferably <0° C., and as low as −10° C.

It is another advantage that mixing and placing of a cementitious composition according to the present invention is possible at temperatures <5° C. and as low as −10° C. without tempering of any of components A or B prior to mixing. Specifically, components A and/or B can be stored, handled, and mixed at temperatures <5° C. and as low as −10° C. Mixing and placing of a cementitious composition of the present invention is thus possible without tempering of mixing water.

It is a further advantage of a composition according to the present invention that good workability of the composition is maintained at temperatures <5° C. and as low as −10° C.

It is yet another advantage of a composition of the present invention that shrinkage is particularly low. Typically shrinkage as measured according to ASTM C596 is <0.05%. This is an advantage as a higher shrinkage leads to more cracking.

It is finally an advantage of a composition of the present invention that flexural strength after 28 d curing at temperatures <5° C., preferably <0° C., and as low as −10° C. is the same as of a reference cured at 23° C.

Compositions of the present invention can thus be used in a variety of applications. They can, for example, be used as repair materials for mortars and concrete, structural repair materials, highway overlays, concrete, putties, grouts, renders, tile adhesives or floor underlayments such as screeds.

Further aspects of the invention are subject matter of further independent claims. Particularly preferred embodiments of the invention are subject matter of the dependent claims.

Ways of Carrying Out the Invention

The expression "OPC" within the context of the present invention refers to ordinary Portland cement. OPC, within the context of the present invention thus describes a cement composition of the type CEM I and/or CEM II according to standard EN 197-1. Cements which are described in alternative standards, for example ASTM C150 and ASTM C595 are equally suitable. Preferably, OPC is a mixture of cements of type CEM I and CEM II. Clinker content in an OPC of the present invention is at least 65 w %, based on the total dry weight of the cement. In certain embodiments of the present invention the clinker content is at least 80 w %, based on the total dry weight of the cement.

It can be advantageous for the OPC to contain other binders in addition to or instead of the Portland cement. These are, in particular, latent hydraulic binders and/or pozzolanic binders. Suitable latent hydraulic and/or pozzolanic binders are, for example, natural pozzolanes, slag, fly ash, silica dust, burned slate and/or limestone. According to certain embodiments, the cementitious binder contains 6-35% by weight of latent hydraulic and/or pozzolanic binders.

A calcium aluminate cement (CAC) of the present invention is a cement with a main phase consisting of hydraulic calcium aluminates, the main phase preferably being CA ($CaO \cdot Al_2O_3$). Other calcium aluminates such as $CA_2$, $C_3A$, $C_{12}A_7$ typically are also present. CAC of the present invention typically also contain other phases selected from belite ($C_2S$), tricalcium silicate, ferrites ($C_2F$, $C_2AF$, $C_4AF$), ternesite ($C_5S_2\$$), and calcium sulfate. CAC of the present invention may further contain calcium carbonate. In particular, a CAC of the present invention is according to standard EN 14647. Suitable CAC can, for example, be commercially obtained from Kerneos SA or Royal White Cement.

In an advantageous embodiment the OPC and/or CAC additionally contains from 0.1 to 35 w %, preferably from 0.1 to 25 w %, especially up from 0.1 to 15 w %, each based on the total dry weight of the cement, of a calcium sulfate. The calcium sulfate may be present in the form of calcium sulfate-hemihydrate (α- and/or β-type), calcium sulfate-dihydrate and/or anhydrite.

A calcium sulfoaluminate cement (CSA) of the present invention is a cement with a main phase consisting of $C_4(A_{3-x}F_x)_3\$$ (4 $CaO \cdot 3\text{-x } Al_2O_3 \cdot x\ Fe_2O_3 \cdot CaSO_4$) where x is an integer of from 0-3. CSA of the present invention typically contain further phases selected from aluminates (CA, $C_3A$, $C_{12}A_7$), belite ($C_2S$), ferrites ($C_2F$, $C_2AF$, $C_4AF$), ternesite ($C_5S_2\$$) and anhydrite. According to certain embodiments CSA of the present invention contains 25-75 w % $C_4A_3\$$, 0-10 w % aluminates, 0-70 w % belite, 0-35 w % ferrites, 0-20 w % ternesite, and 0-20 w % anhydrite, each based on the total dry weight of the CSA cement. Suitable CSA can, for example, be commercially obtained from Heidelberg Cement AG or under the tradename Calumex from Caltra B. V.

Additionally, a cement of the present invention may contain cement improvers chosen from the group consisting of grinding aids, strength improvers, activators, accelerators, fibers, plasticizers, and/or superplasticizers. Cement improvers may be interground with the clinker during milling. They may likewise be admixed to the milled clinker.

Component A of a composition of the present invention contains at least one OPC and at least one further cement selected from CAC and/or CSA as described above. The content of the at least one OPC is from 15-69 w %, preferably from 20-50 w %, especially from 25-40 w %, based on the total dry weight of the component A. The content of the at least one further cement selected from CAC and/or CSA in the component A is from 1-25 w %, preferably from 2-20 w %, especially from 5-15 w %, based on the total dry weight of the component A.

It is also possible to add additional calcium sulfate of any of the above types to a component A of the present invention together with the cement. Additional calcium sulfate may be added with the provision that the total w % of calcium sulfate, based on the cement dry weight, is not increased over the upper limits as defined above. Suitable types of calcium sulfate can be commercially obtained for example from United States Gypsum Co or Solvay Chemicals Inc.

The cement composition of the component A is an OPC-rich cement composition. The weight ratio of OPC cement to the CAC and/or CSA in the component A therefore is >1, preferably >2, more preferably >5. A ratio lower than 1 may lead to problems with curing at temperatures <0° C. and with long term durability.

The at least one OPC of the present invention and the at least one further cement selected from CAC and/or CSA may be mixed dry by any process known to the person skilled in the art in the weight ratios as stated above.

According to another embodiment, OPC and CAC and/or CSA clinkers can be interground in the weight ratios as stated above in a ball mill or roller mill to make a composite cement and said composite cement can be used in a component A of the present invention. If a composite cement is used in component A, the dosage preferably is from 16-70 w %, preferably from 20-50 w %, especially from 25-40 w %, based on the total dry weight of said component A.

The powder P is preferably selected from the group consisting of carbonates or hydrogen carbonates of alkali and/or alkali earth metals. Especially preferred are calcium carbonate, Dolomite and magnesium carbonate. These fillers are available in a range of different particle sizes. It can be preferred to use mixtures of these mineral fillers.

In a preferred embodiment the powder P is calcium carbonate or consists to a major part of calcium carbonate.

Calcium carbonate can be available from natural sources as for example limestone, chalk or marble and may contain other minerals as impurities. Likewise, calcium carbonate can be produced synthetically, for example by precipitation from $CaO$-slurries with $CO_2$ or by spray-drying $CaCO_3$ slurries. Typically, calcium carbonate powder contains a minimum of 90 w % calcium carbonate, based on the total weight of the said powder.

In a preferred embodiment a minimum of 50 w %, preferably a minimum of 70 w %, especially 100 w % of the total weight of the powder P are calcium carbonate.

The powder P of the present invention can be an amorphous or crystalline powder. In a preferred embodiment the powder P is a crystalline powder.

The term "particle size" refers for the present purposes to a median of the particle size distribution of a solid. This median is given as the D50 value of a given particle size distribution and constitutes the value of the particle diameter at 50% in the cumulative distribution. The D50 value is usually interpreted as the particle size where 50% of the particles of a given distribution are larger and 50% are smaller. The D50 is thus a number median. The particle size of solid particles with a diameter larger than approximately 0.1 mm is typically measured by sieve analysis. The particle size of solid particles with a diameter smaller than approximately 0.1 mm is typically measured by laser light scattering, preferably in accordance with the standard ISO 13320: 2009. In particular, a Mastersizer 2000 instrument with a Hydro 2000G dispersing unit and the Mastersizer 2000 software from Malvern Instruments GmbH (Germany) can be used for this purpose.

The powder P has a particle size D50 of <10 μm, preferably <5 μm. Especially preferred are particle sizes D50 of 3.5 μm, 1 μm, 0.1 μm, 0.09 μm, 0.08 μm, 0.07 μm, and 0.06 μm.

In a preferred embodiment the powder P contains less than 20 w %, preferably less than 10 w %, especially less than 5 w %, in particular less than 3 w % of particles with a particle size of more than 25 μm, preferably more than 20 μm. A too high content of large particles of powder P may reduce the effect of the accelerator.

In another preferred embodiment the powder P has a content of at least 10 w %, preferably at least 20 w %, especially at least 30 w % of particles with a particle size of less than 2 μm. It is particularly preferred that the powder P has a content of at least 10 w % of a particle size of less than 1 μm.

Component A of the present invention comprises at least one powder P in an amount of 0.1-15 w %, preferably 0.5-10 w %, especially 1-5 w %, based on the total dry weight of component A.

The term "aggregate" as used in the context of the present invention refers to mineral materials that are non-reactive in the hydration reaction of cementitious binders. Aggregates can be any aggregate typically used for cementitious compositions such as concrete, mortars, screeds, renders, grouts, coatings, putties or the like. Typical aggregates are for example rock, crushed stone, gravel, slag, sand, recycled concrete, perlite or vermiculite.

According to certain embodiments, component A of a composition of the present invention comprises aggregates, preferably sand. Sand is a naturally occurring granular material composed of finely divided rock or mineral particles. It is available in various forms and sizes. Examples of suitable sand are quartz sand, limestone sand, river sand or crushed aggregates. Sands are for example described in standards ASTM C778 or EN 196-1.

Preferably, at least part of the sand is quartz sand or limestone sand or a mixture thereof, especially preferred is quartz sand, since it is chemically inert, strong, available in various sizes and the workability of the composition can be set advantageously.

Commonly, sand is supplied in different fractions of grains passing through a sieve with clear openings. Preferred is sand of which at least 95 w % are smaller than 5 mm, more preferred smaller than 4 mm, even more preferred smaller than 3.5 mm. Large particles in component A may lead to improper mixing.

Preferably, at least part of the sand has a particle size of at least 100 μm, more preferred at least 200 μm. Such granulometry enables an optimized grain size distribution for homogeneous mixing, good rheology of the fresh mortar and high strength of the hardened mortar.

Preferred sand has a size from 0.04 to 5 mm, more preferred from 0.05 to 4 mm and even more preferred from 0.05 to 3.6 mm.

Component A comprises from 30-70 w %, preferably 40-65 w %, especially 50-60 w %, based on the total dry weight of component A, of sand.

It can be advantageous if the component A of the present invention additionally contains other additives for mineral binder compositions, in particular cementitious binder compositions. Such additives can be for example, plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents.

According to certain embodiments, a superplasticizer is added to the component A of the present invention. The addition of superplasticizers is particularly preferred if the powder P has a particle size D50<1 μm.

Superplasticizers can be any known to the person skilled in the art. Particular suitable superplasticizers can be poylcarboxylic ethers. Polycarboxylic ethers are comb polymers with a polycarboxylic backbone and polyalkylenoxide sidechains. Such polycarboxylic ethers are for example described in EP 2 468 696 (Sika Technology AG).

Superplasticizers, in particular polycarboxylic ethers, can be added to compositions of the present invention in 0.001-10 w %, preferably 0.1-5 w %, especially 0.25-2.5 w %, calculated as dry weight of superplasticizer, based on the total weight of the component A.

Other suitable superplasticizers include lignosulphonates, polynaphthalene sulphonates, polyamine sulphonates, vinyl copolymers and polyethyleneoxide phosphonates. It can be preferred to add a mixture of different superplasticizers to an accelerator of the present invention.

According to certain embodiments, a synthetic organic polymer, which is different from the superplasticizers as described above, is added to the component A of the present invention. Synthetic polymers can be produced by radical polymerization of monomers selected form the group consisting of ethylene, propylene, butylene, isoprene, butadiene, styrene, acrylonitrile, acrylic acid, methacrylic acid, esters of acrylic acid, esters of methacrylic acid, vinylesters, vinylchloride. It is preferred that synthetic polymers are copolymers synthesized from two or more, preferably two, different monomers. The sequence of the copolymer can be alternating, blocked or random. Preferred synthetic polymers are copolymers of vinylacetate and ethylene, vinylacetate and ethylene and methylmethacrylate, vinylacetate and ethylene and vinylester, vinylacetate and ethylene and acrylic acid ester, vinylchloride and ethylene and vinyllaureate, vinylacetate and vinylversatate, acrylic ester and styrene, acrylic ester and styrene and butadiene, acrylic ester and acrylonitrile, styrene and butadiene, acrylic acid and styrene, methacrylic acid and styrene, styrene and acrylic acid ester, styrene and methacrylic acid ester.

The glass transition temperature (Tg) of said synthetic polymers can vary in a wide range. Tg of suitable synthetic polymers can be for example between −50° C. and +60° C., preferably between −45° C. and +50° C., more preferred between −25° C. and +35° C.

It is possible and in certain cases preferred to use mixtures of more than one of the said synthetic polymers in compositions of the present invention.

According to certain embodiments, synthetic polymers are used in solid form such as for example redispersible polymer powders. Such redispersible powders can be manufactured for example by spray drying of polymer dispersions as for example described in patent application EP 1042391. Suitable redispersible powders are for example available from Wacker Chemie AG under the trade name Vinnapas. The use of redispersible powders of synthetic polymers is preferred for the context of the present invention.

According to certain embodiments, retarders are added to a component A of the present invention. Particularly useful retarders are borates, borax, citric acid or its salts, tartaric acid or its salts, and sodium gluconate. Mixtures of different retarders can be used.

Preferably, component A is a solid in form of a powder and/or granular material.

Component A of the present invention can made by mixing the at least one OPC, the at least one CAC and/or CSA, the powder P, optionally aggregate, and optionally other additives by any process known to the person skilled in the art. According to certain embodiments, component A can be made by mixing the mentioned ingredients in horizontal single shaft mixers, twin shaft paddle mixers, vertical shaft mixers, ribbon blenders, orbiting mixers, change-can mixers, tumbling vessels, vertical agitated chambers or air agitated operations. Mixing can be continuously or batch-wise.

An "accelerator" in the context of the present invention is an additive for OPC, CAC and/or CSA which will shorten the time after addition of water until a given level of compressive strength is reached as compared to a reference without any such additive added. Accelerators as understood in the context of the present invention are described in more detail in standard EN 934-2, table 6. Accelerators thus increase the hardening reaction. One advantage of using accelerators can be to obtain the final compressive strength faster and thus be able to continue working on a job site earlier.

Component B of the present invention contains at least one accelerator selected from the group consisting of alkanolamines, halides, formates, acetates, oxalates, nitrites, nitrates, thiocyanates, sulphates, thiosulphates, glycerol, α-hydroxycarboxylic acids, and calcium aluminates.

According to certain embodiments, the at least one accelerator is selected from calcium formate, sodium nitrite, potassium nitrite, magnesium nitrite, calcium nitrite, sodium nitrate, potassium nitrate, magnesium nitrate, calcium nitrate, ammonium thiocyanate, sodium thiocyanate, potassium thiocyanate, methyldiethanolamine, triethanolamine, triisopropanolamine, diethanolisopropanolamine, diisopropanolethanolamine, tetraethanolethylendiamine, glycerol, glycolic acid, or lactic acid. According to a preferred embodiment, the at least one accelerator is a nitrate, preferably calcium nitrate.

It can be advantageous, and in certain cases also preferred, that mixtures of two or more accelerators are used.

Component B comprises the at least one accelerator in an amount of 30-90 w %, preferably 40-80 w %, especially 50-75 w %, based on the total weight of component B.

According to an embodiment of the present invention, the component B is essentially free of lithium or lithium salts. Essentially free means that the lithium content is <0.01 w % based on the total weight of component B.

The component B contains at least one ant-freeze agent. An "anti-freeze" agent within the context of the present invention is a material that lowers the freezing point of water. The at least one anti-freeze agent is selected from the group of sodium chloride, urea, and glycols, especially ethylene glycol, propylene glycol, or neopentylglycol. The use of sodium chloride is less preferred due to its high potential for corrosion of steel reinforcement. According to a preferred embodiment, the anti-freeze agent is a glycol, preferably neopentylglycol.

The anti-freeze agent is comprised in component B with 0.1-5 w %, preferably 0.25-1 w %, based on the total weight of said component B.

The component B further contains water. Water can be any water available such as distilled water, purified water, tap water, mineral water, spring water, and well water. The use of waste water is possible only in cases where the composition of such waste water is known and where none of the impurities contained may impart the functionality of any other component of the composition of the present invention. The use of salt water is not possible due to its high content of chlorides and the risk of corrosion of steel reinforcement associated therewith.

Water is contained in component B of the present invention in an amount of 10-70 w %, preferably 20-60 w %, especially 25-50 w %, based on the total weight of component B.

It can be advantageous if the component B of the present invention additionally contains other additives for mineral binder compositions, in particular cementitious binder compositions. Such additives can be for example, plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, and/or chromate reducers. It is especially advantageous if the component B of the present invention additionally contains anti-microbial agents.

The component B of the present invention can be in form of a paste or a liquid. Preferably, component B is in the form of a liquid.

Preferably, components A and B of a composition of the present invention are stored in separate packagings. Suitable packagings can be any known to the person skilled in the art. Component A of the present invention, which preferably is a powder, can, for example, be stored in silos, big bags, paper bags, foil bags, cardboard, metal buckets or cans or in plastic buckets or cans. Component B of the present invention, which preferably is a liquid, can, for example, be stored in silos, IBC, foil bags, metal buckets or cans, plastic buckets or cans or in cartridges.

It is possible to combine packaged components A and B of the present invention into a 2-component packaging with the provision that both components A and B are spatially separated. One example of a suitable 2-component packaging is a flexible bag comprising at least two separate sealed chambers which are isolated from each other by a removable or frangible seal.

The mixing of components A and B of a composition of the present invention can be done by any process known to the person skilled in the art. Mixing can be continuously or batch wise.

According to certain embodiments mixing can be done in Hobart mixers, portable concrete mixers, mixing trucks, mixing buckets, paddle mixers, jet mixers, screw mixers, or auger mixers.

The mix ratios of components A and B of the present invention can vary in a wide range. Suitable mix ratio of component A to B are from 50:1 to 1:100, preferably from 15:1 to 1:15, more preferably from 10:1 to 1:5, especially from 6:1 to 1:2 by weight. It is preferred within the context of the present invention, that the water contained in the component B of the present invention is sufficient to cure the cementitious composition according to the present invention. It is thus preferred that no additional mixing water is added during mixing. It is therefore possible to store, handle, and mix a cementitious composition of the present invention at temperatures <5° C., especially <0° C., and as low as −10° C. without prior tempering of mixing water. It is, however, possible to add additional mixing water in cases where a higher w/c ratio has to be achieved. If additional mixing water is added, it is preferred, that such water is used to further dilute the component B of the present invention. Any such dilution of a component B of the present invention may lead to prolongation of the setting of a cementitious composition of the present invention which is prepared with such diluted component B.

According to a particularly preferred embodiment, at least 66%, preferably at least 70% of the total weight of component B to be used are first introduced into a suitable mixer, followed by addition of the full amount of component A. The remaining weight of the component B is then added after some mixing. By this procedure, bleeding of the mix can be reduced.

The present invention therefore also relates to a kit-of-parts consisting of the component A and a component B which are packaged in spatially separated packagings.

The present invention thus also relates to a kit-of parts comprising a first packaging containing a component A comprising
a) at least one ordinary Portland cement (OPC)
b) at least one cement selected from calcium aluminate cement (CAC) and/or calcium sulfoaluminate cement (CSA)
c) a powder P, selected from the group consisting of carbonates or hydrogen carbonates of alkali and/or alkaline earth metals
d) optionally aggregates
e) optionally other additives selected from the groups of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents, and a second packaging containing a component B comprising
a) at least one accelerator selected from the group consisting of alkanolamines, halides, formats, acetates, oxalates, nitrites, nitrates, thiocyanates, sulphates, thiosulphates, glycerol, ax-hydroxycarboxylic acids, and calcium aluminates,
b) an anti-freeze agent
c) water, and
d) optionally other additives selected form the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents.

According to an especially preferred embodiment, the weight ratio of the component A in a first packaging to the component B in a second packaging is from 50:1 to 1:100, preferably from 15:1 to 1:15, more preferably from 10:1 to 1:5, especially from 6:1 to 1:2 by weight. This allows the use of full packagings in mixing operations and thus simplifies mix operations on construction sites and reduces errors due to wrong dosage.

Compositions of the present invention can be used in a variety of applications. They can, for example, be used as repair material for mortars and concrete, structural repair material, highway overlays, concrete, putties, grouts, renders, tile adhesives or floor underlayments such as screeds.

The present invention thus also relates to a method for producing a shaped body, the method comprising the steps of
a) providing a component A of a composition of the present invention
b) providing a component B of a composition of the present invention
c) mixing component A and component B in a weight ratio of from 50:1 to 1:100, preferably from 15:1 to 1:15, more preferably from 10:1 to 1:5, especially from 6:1 to 1:2,
d) placing of the mixed composition of the present invention.

Preferably, at least one of the steps a)-d) of a method for producing a shaped body is done at a temperature of <5° C., especially <0° C., and as low as −10° C.

A shaped body within the present context can be any part of a building such as for example a joint, a floor, a screed, a wall, a footing, a footpath, an overlay or a patch repair.

The present invention further relates to a method for jointing of porous materials, the method comprising the steps of
a) providing a component A of a composition of the present invention
b) providing a component B of a composition of the present invention c) mixing component A and component B in a weight ratio of from 50:1 to 1:100, preferably from 15:1 to 1:15, more preferably from 10:1 to 1:5, especially from 6:1 to 1:2, d) optionally pretreating one or more of the surfaces to be joined, for example by cleaning from dust and loose parts and applying a primer, and e) placing of the mixed composition of the present invention to said concrete surface.

Preferably, at least one of the steps a)-e) of a method for jointing of porous materials is done at a temperature of <5° C., especially <0° C., and as low as −10° C.

Suitable materials to be jointed are porous materials such as bricks, mortar, concrete, tiles, and natural stone.

The present invention finally also relates to a method for repairing cementitious substrates such as e.g. concrete and mortar, the method comprising the steps of a) providing a component A of a composition of the present invention b) providing a component B of a composition of the present invention c) mixing component A and component B in a weight ratio of from 50:1 to 1:100, preferably from 15:1 to 1:15, more preferably from 10:1 to 1:5, especially from 6:1 to 1:2, d) pretreating the surface of the substrate to be repaired, for example by cleaning from dust, loose parts, oil and grease and/or applying a primer, and e) placing of the mixed composition of the present invention to said cementitious substrate.

Preferably, at least one of the steps a)-e) of a method for repairing cementitious substrates is done at a temperature of <5° C., especially <0° C., and as low as −10° C.

It is preferred that in step c) of any of the above methods at least 66%, preferably at least 70% of the total weight of component B to be used are first introduced into a suitable mixer, followed by the addition of the full amount of component A. The remaining weight of the component B is then added after some mixing.

An additional aspect of the present invention pertains to a shaped body which is obtainable by curing a composition according to the present invention as described above. The shaped body thus produced may have virtually any desired form and may for example be part of an edifice, such as of a building, of a masonry construction or of a bridge, for example. According to a preferred embodiment, to produce the said shaped body the curing is done at a temperature of between 5° C. and −10° C., preferably a temperature of between 0° C. and −10° C.

The following working examples illustrate the invention. The examples are not intended to limit the scope of the invention in any way.

WORKING EXAMPLES

Compressive strength was determined according to standard ASTM C-109 using 4×4×16 cm prisms. The prisms were hardened under conditions as indicated in below table 3. Measurement was done after the time given in table 4 starting from the addition of mixing water.

Flexural strength was measured according to standard ASTM C-348 using 4×4×16 cm prisms. The prisms were hardened under conditions as indicated in below table 3 for 7 d.

Linear shrinkage was measured according to ASTM C157 after 28 d of curing under the conditions as given in below table 3.

Tensile adhesion strength of an epoxy coating was measured according to ACI 503R (Appendix A) after 28 d of curing on the respective cementitious material and under the conditions as given in below table 3. Substrate failure occurred in all cases.

Preparation of Components A

The following table 1 gives an overview of the components A. The component A denominated E-1-A is according to the present invention, component A denominated C-1-A is a comparative example and not according to the present invention.

All ingredients of the respective components A, were weighed into a Hobart mixer and mixed for 3 minutes at 23° C. and 50% relative humidity. The resulting dry mixes were stored in plastic containers with closed lids under conditions as indicated in below table 3 before mixing with the respective components B.

TABLE 1

|  | E-1-A | C-1-A |
|---|---|---|
| OPC* | 33 | 17 |
| CAC | 6.5 | 18.5 |
| Sand 16-40** | 17 | 24 |
| Sand 30-40** | 38 | 36.5 |
| CaCO₃*** | 3 |  |
| Sika ViscoCrete 225 P **** | 0.3 | 0.04 |
| Anhydrite (CaSO₄) ***** | 2.2 | 3.96 | all dosage in weight-%
*"CEMEX Type I/II" available from Cemex Inc.
**according to ASTM C778
***CaCO₃(98% purity), D50 = 3.5 μm, D98 = 21 μm, Particles <2 μm: 32 w %
**** PCE available from Sika Corporation
***** "Snow White Filler" from United States Gypsum Co.

Preparations of Components B

The following table 2 gives an overview of the components B. The component B denominated E-1-B is according to the present invention. All ingredients of E-1-B were weighed into a Hobart mixer and mixed for 1 minute at 23° C. and 50% relative humidity. The resulting liquid was stored in a plastic container with closed lid under conditions as indicated in below table 3 before mixing with the respective components A. Component C-1-B contains only water and is not according to the present invention.

TABLE 2

|  | E-1-B | C-1-B |
|---|---|---|
| Calcium nitrate* | 52 |  |
| Neopentylglycol** | 0.5 |  |
| Water | 47.5 | 100 | all dosage in weight-%
*99% purity, available from Sigma Aldrich
**99% purity, available from Sigma Aldrich Preparation of Cementitious Compositions The following table 3 gives an overview of the cementitious compositions prepared. In each case, the respective components A and B were stored, mixed, and cured under the temperature conditions as indicated in table 3. Mixing was done in a Hobart mixer, the mix ratio A:B was 5.6:1 by weight for examples C-3, C-4, E-1, and E-2 and 12.6:1 by weight for examples C-1 and C-2, each resulting in a w/c ratio of 0.2. The full amount of the respective component B was weighed into the Hobart mixer, followed by the full amount of the respective component A. Mixing was done for 3 minute at 23° C.

TABLE 3

| Example | Component A | T (storage A) | Component B | T (storage B) | T curing |
|---|---|---|---|---|---|
| C-1 | C-1-A | 23° C. | C-1-B | 15° C. | 23° C. |
| C-2 | C-1-A | −5° C. | C-1-B | 15° C. | −6° C. |
| C-3 | C-1-A | −5° C. | E-1-B | −5° C. | −6° C. |
| C-4 | C-1-A | −8° C. | E-1-B | −10° C. | −10° C. |
| E-1 | E-1-A | −5° C. | E-1-B | −5° C. | −6° C. |
| E-2 | E-1-A | −8° C. | E-1-B | −10° C. | −10° C. |

The following table 4 gives an overview of the results.

TABLE 4

| Example | Compressive strength [MPa] | | | | | Flexural strength [MPa] | Linear shrinkage [%] | Tensile adhesion strength [MPa] |
|---|---|---|---|---|---|---|---|---|
| | 1 h | 2 h | 24 h | 7 d | 28 d | | | |
| C-1 | 17.2 | 27.6 | 39.3 | 44.8 | 49 | 5.5 | 0.06% | 2.1 |
| C-2 | 11.3 | | 32.8 | 40.9 | 45 | | | |
| C-3 | n.c. | n.c. | 30 | 41 | 42 | | | |
| C-4 | n.c. | n.c. | n.c. | | 20 | | | |
| E-1 | | 12 | 30 | 48 | 50 | 5 | <0.05% | 2 |
| E-2 | n.c. | n.c. | 25 | 36 | 42 | | <0.05% | | n.c. not cured

As can be seen from the results in above table 4, the built-up of compressive strength of a CAC-rich mortar without the powder P added is reduced if cured at low temperature and even the compressive strength attained after 28 d is lowered compared to the reference C-1 (see comparative example C-2). Examples C-3 and C-4 show that curing of a CAC-rich mortar without the powder P added at temperatures well below 0° C. cannot be accelerated with a component B of the present invention. It is thus not possible to use mixing water with a temperature close to or below 0° C. together with C-1-A. Inventive examples E-1 and E-2 show, that a mortar based on inventive components A and B attains sufficient compressive strength within 2 hours when cured at −6° C. and also sufficient compressive strength within 24 hours when cured at −10° C., especially with both components A and B being conditioned to temperatures well below 0° C.

The linear shrinkage of inventive mortars E-1 and E-2 was lower than the one of the reference C-1. At the same time, flexural strength as well as tensile adhesion strength of inventive composition E-1 were the same when cured at low temperature as the reference C-1 when cured at 23° C.

The invention claimed is:

1. A cementitious composition essentially consisting of a first component A comprising
   a) 15-69 w % of at least one ordinary Portland cement (OPC),
   b) 1-25 w % of at least one cement selected from calcium aluminate cement (CAC) and/or calcium sulfoaluminate cement (CSA),
   c) 0.1-15 w % of a powder P, selected from the group consisting of carbonates or hydrogen carbonates of alkali and/or alkaline earth metals,
   d) optionally 30-70 w % of aggregates,
   e) optionally 1-15 w % of other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
   each based on the total weight of the component A, and a second component B comprising
   f) 30-90 w % of at least one accelerator selected from the group consisting of alkanolamines, halides, formats, acetates, oxalates, nitrites, nitrates, thiocyanates, sulphates, thiosulphates, glycerol, α-hydroxycarboxylic acids, and calcium aluminates,
   g) 0.1-5 w % of an anti-freeze agent which is selected from the group of sodium chloride, urea, and glycols,
   h) 10-70 w % of water, and
   i) optionally other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
   each based on the total weight of the component B.

2. The cementitious composition according to claim 1, wherein the weight ratio of the at least one OPC to the at least one CAC and/or CSA is >1.

3. The cementitious composition according to claim 1, wherein the powder P has a particle size D50 of <10 μm.

4. The cementitious composition according to claim 1, wherein the at least one accelerator is a nitrate.

5. The cementitious composition according to claim 1, wherein the anti-freeze agent is selected from ethylene glycol, propylene glycol, or neopentyl glycol.

6. The cementitious composition according to claim 1, wherein the composition further contains from 0.1 to 35 w % of $CaSO_4$, based on the total weight of cement in component A.

7. The cementitious composition according to claim 1, wherein the mix ratio by weight of component A to component B is from 50:1 to 1:100.

8. A shaped body, obtained by curing a cementitious composition according to claim 1.

9. The shaped body according to claim 8, wherein the curing is done at a temperature of between 5° C. and −10° C.

10. A kit-of-parts comprising a first packaging containing a component A comprising a) at least one ordinary Portland cement (OPC)
b) at least one cement selected from calcium aluminate cement (CAC) and/or calcium sulfoaluminate cement (CSA)
c) a powder P, selected from the group consisting of carbonates or hydrogen carbonates of alkali and/or alkaline earth metals
d) optionally aggregates
e) optionally other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents, and a second packaging containing a component B comprising
a) at least one accelerator selected from the group consisting of alkanolamines, halides, formats, acetates, oxalates, nitrites, nitrates, thiocyanates, sulphates, thiosulphates, glycerol, α-hydroxycarboxylic acids, and calcium aluminates,
b) an anti-freeze agent which is selected from the group of sodium chloride, urea, and glycols,
c) water, and
d) optionally other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents.

11. A method for producing a shaped body, the method comprising the steps of
a) providing a component A that comprises:
i) 15-69 w % of at least one ordinary Portland cement (OPC),
ii) 1-25 w % of at least one cement selected from calcium aluminate cement (CAC) and/or calcium sulfoaluminate cement (CSA),
iii) 0.1-15 w % of a powder P, selected from the group consisting of carbonates or hydrogen carbonates of alkali and/or alkaline earth metals,
iv) optionally 30-70 w % of aggregates,
v) optionally 1-15 w % of other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
each based on the total weight of the component A,
b) providing a component B that comprises:
vi) 30-90 w % of at least one accelerator selected from the group consisting of alkanolamines, halides, formats, acetates, oxalates, nitrites, nitrates, thiocyanates, sulphates, thiosulphates, glycerol, (α-hydroxycarboxylic acids, and calcium aluminates,
vii) 0.1-5 w % of an anti-freeze agent which is selected from the group of sodium chloride, urea, and glycols,
viii) 10-70 w % of water, and
ix) optionally other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
each based on the total weight of the component B,
c) mixing component A and component B in a weight ratio of from 50:1 to 1:100 to obtain a mixed composition, and
d) producing the shaped body with the mixed composition.

12. A method according to claim 11, wherein at least one of the steps is carried out at a temperature of between 5° C. and −10° C.

13. The method according to claim 11, wherein step c) comprises the steps of
i) charging at least 66%, of the total weight of component B into a suitable mixer,
ii) charging the full amount of component A into the mixer,
iii) mixing
iv) charging the remaining weight of the component B into the mixer, and
v) mixing.

14. A method for jointing of porous materials, the method comprising the steps of
a) providing a component A that comprises:
i) 15-69 w % of at least one ordinary Portland cement (OPC),
ii) 1-25 w % of at least one cement selected from calcium aluminate cement (CAC) and/or calcium sulfoaluminate cement (CSA),
iii) 0.1-15 w % of a powder P, selected from the group consisting of carbonates or hydrogen carbonates of alkali and/or alkaline earth metals,
iv) optionally 30-70 w % of aggregates,
v) optionally 1-15 w % of other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
each based on the total weight of the component A,
b) providing a component B that comprises:
vi) 30-90 w % of at least one accelerator selected from the group consisting of alkanolamines, halides, formats, acetates, oxalates, nitrites, nitrates, thiocyanates, sulphates, thiosulphates, glycerol, (α-hydroxycarboxylic acids, and calcium aluminates,
vii) 0.1-5 w % of an anti-freeze agent which is selected from the group of sodium chloride, urea, and glycols,
viii) 10-70 w % of water, and
ix) optionally other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
each based on the total weight of the component B,
c) mixing component A and component B in a weight ratio of from 50:1 to 1:100 to obtain a mixed composition,
d) optionally pretreating one or more of the surfaces of the porous materials to be joined, and e) placing of the mixed composition on the one or more surfaces of the porous materials.

15. A method for repairing cementitious substrates, the method comprising the steps of
a) providing a component A that comprises:
i) 15-69 w % of at least one ordinary Portland cement (OPC),
ii) 1-25 w % of at least one cement selected from calcium aluminate cement (CAC) and/or calcium sulfoaluminate cement (CSA),
iii) 0.1-15 w % of a powder P, selected from the group consisting of carbonates or hydrogen carbonates of alkali and/or alkaline earth metals,
iv) optionally 30-70 w % of aggregates,
v) optionally 1-15 w % of other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents, each based on the total weight of the component A,
b) providing a component B that comprises:
vi) 30-90 w % of at least one accelerator selected from the group consisting of alkanolamines, halides, formats, acetates, oxalates, nitrites, nitrates, thiocyanates, sulphates, thiosulphates, glycerol, (α-hydroxycarboxylic acids, and calcium aluminates,
vii) 0.1-5 w % of an anti-freeze agent which is selected from the group of sodium chloride, urea, and glycols,
viii) 10-70 w % of water, and
ix) optionally other additives selected from the group of plasticizers, superplasticizers, rheology modifiers, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents,
each based on the total weight of the component B,
c) mixing component A and component B in a weight ratio of from 50:1 to 1:100 to provide a mixed composition,
d) pretreating the surface of the cementitious substrate to be repaired, and
e) applying the mixed composition to the cementitious substrate.

* * * * *